(12) United States Patent
Cai et al.

(10) Patent No.: US 12,453,523 B2
(45) Date of Patent: Oct. 28, 2025

(54) C-ARM IMAGING SYSTEM AND TUBE ASSEMBLY MOUNTING METHOD

(71) Applicant: GE Precision Healthcare LLC, Wauwatosa, WI (US)

(72) Inventors: Changliang Cai, Beijing (CN); Zhan Wang, Beijing (CN); Tiean Lei, Beijing (CN); Jundong Li, Beijing (CN); Da Sheng, Beijing (CN)

(73) Assignee: GE Precision Healthcare LLC, Wauwatosa, WI (US)

( * ) Notice: Subject to any disclaimer, the term of this patent is extended or adjusted under 35 U.S.C. 154(b) by 336 days.

(21) Appl. No.: 18/160,188

(22) Filed: Jan. 26, 2023

(65) Prior Publication Data

US 2023/0233166 A1 Jul. 27, 2023

(30) Foreign Application Priority Data

Jan. 27, 2022 (CN) .......................... 202210101327.2

(51) Int. Cl.
*A61B 6/00* (2024.01)
(52) U.S. Cl.
CPC .......... *A61B 6/4441* (2013.01); *A61B 6/4405* (2013.01)

(58) Field of Classification Search
CPC ........................... A61B 6/4405; A61B 6/4441
See application file for complete search history.

(56) References Cited

U.S. PATENT DOCUMENTS

2015/0010131 A1\* 1/2015 Arisaka ............... A61B 6/4488
378/197

FOREIGN PATENT DOCUMENTS

| CN | 109044388 A | 12/2018 |
| CN | 105125226 B | 7/2019 |
| CN | 210784380 U | 6/2020 |

\* cited by examiner

*Primary Examiner* — Dani Fox

(57) ABSTRACT

Provided in the present application are a C-arm imaging system and a tube assembly mounting method. The C-arm imaging system includes a C-arm, a tube assembly, a detector assembly, and a rotation assembly. The C-arm includes an inner surface and an outer surface disposed opposite to each other. The tube assembly is located at a first end of the C-arm, and is mounted on the inner surface of the C-arm. The detector assembly is located at a second end of the C-arm opposite to the first end. The rotation assembly is mounted on the outer surface of the C-arm. The C-arm is movable relative to the rotation assembly, and an outer surface opposite to an inner surface on which the tube assembly is located is slidable relative to the rotation assembly.

11 Claims, 9 Drawing Sheets

C-ARM IMAGING SYSTEM AND TUBE ASSEMBLY MOUNTING METHOD

CROSS REFERENCE TO RELATED APPLICATIONS

This application claims priority to Chinese Patent Application No. 202210101327.2, filed on Jan. 27, 2022, the disclosure of which is incorporated herein by reference in its entirety.

TECHNICAL FIELD

The present invention relates to medical imaging technology, and more specifically to a C-arm imaging system and a tube assembly mounting method.

BACKGROUND

Medical imaging systems can be used in various applications, including medical applications and industrial applications. In a medical environment, X-ray imaging systems can perform tissue and bone imaging for patients in a non-invasive manner. The X-ray imaging systems are capable of capturing a plurality of images at a specified interval, and sequentially displaying the images to create a single image of an object under test.

The X-ray imaging systems generate the image of the object under test by exposing the object to an energy source, for example, X-rays passing through the object. The generated image may be used for a variety of purposes. The X-ray imaging systems include suspended X-ray imaging systems, mobile X-ray imaging systems, C-arm imaging systems, and the like. The "C-arm" generally refers to an X-ray imaging device having a rigid and/or articulating structural member. The rigid and/or articulating structural member has an X-ray source and a detector assembly. The X-ray source and the detector assembly are respectively located at opposite end portions of the structural member, so that the X-ray source and the detector are disposed opposite to each other. The structural member is usually "C" shaped, and is thus referred to as a C-arm. In this way, X-rays emitted by the X-ray source can strike the detector and provide an X-ray image of one or more objects placed between the X-ray source and the detector.

FIG. 1 shows a C-arm imaging system 10 in some prior art embodiments. As shown in FIG. 1, a tube assembly 12 where an X-ray source is located is located at an end portion 15 of a C-arm 11, and the tube assembly 12 is generally mounted at a side of the end portion 15, that is, a side of the tube assembly 12 is connected to the end portion 15 of the C-arm 11. Generally, at least a part of the tube assembly 12 (for example, an X-ray tube and a transformer portion) is located on an outer side of the C-arm 11, that is, outside the outer circumference of the C-arm, and at least another part of the tube assembly 12 (for example, a collimator) is located within the inner circumference of the C-arm.

The C-arm 11 is slidable relative to a motion assembly 14. When the C-arm rotates clockwise from a first position shown in FIG. 1, that is, when the tube assembly 12 rotates toward the motion assembly 14 in a direction 17, due to blocking by the tube assembly, a 90 degree rotation cannot be achieved; that is, the tube assembly cannot be rotated such that a line connecting the center of the detector and the tube assembly is in a horizontal direction. As a result, the rotation angle of the C-arm is limited, and positioning and photography at certain positions or angles cannot be achieved.

In addition, since part of the tube assembly is located on the outer side of the C-arm, the entire system, especially the C-arm as a whole, is located at a greater height, and the space between the tube assembly and the detector assembly is relatively limited, which further increases the risk of collision with an examination table.

SUMMARY

Provided in the present invention are a C-arm imaging system and a tube assembly mounting method.

Provided in an exemplary embodiment of the present invention is a C-arm imaging system. The system comprises a C-arm, a tube assembly, a detector assembly, and a rotation assembly. The C-arm comprises an inner surface and an outer surface disposed opposite to each other. The tube assembly is located at a first end of the C-arm, and is mounted on the inner surface of the C-arm. The detector assembly is located at a second end of the C-arm opposite to the first end. The rotation assembly is mounted on the outer surface of the C-arm. The C-arm is movable relative to the rotation assembly, and an outer surface opposite to an inner surface on which the tube assembly is located is slidable relative to the rotation assembly.

Specifically, the C-arm comprises an extension portion extending along the first end, an inner surface of the extension portion is configured to be a plane, the plane is configured to mount the tube assembly thereon, and an outer surface of the extension portion is slidable relative to the rotation assembly.

Specifically, a mounting assembly is further provided. The mounting assembly is disposed on the extension portion and comprises at least one positioning recess, and the tube assembly comprises at least one protrusion corresponding to the at least one positioning recess.

Specifically, the mounting assembly comprises a first plate and a second plate disposed perpendicularly to each other, the first plate is disposed on the plane of the extension portion and used to support the tube assembly, the second plate is disposed on a side located away from the first end, and the at least one positioning recess is disposed on the first plate or the second plate.

Specifically, the mounting assembly comprises two positioning recesses, and the two positioning recesses are diagonally disposed.

Specifically, the mounting assembly further comprises a fixing plate perpendicular to the first plate, the fixing plate is mounted at an end portion of the first end, and the fixing plate is configured to fix the tube assembly.

Specifically, the fixing plate comprises at least one threaded hole, and the tube assembly comprises at least one through-hole fitting with the at least one threaded hole.

Specifically, the mounting assembly further comprises an extension housing, and the extension housing extends horizontally from an end portion of the second plate to the inner surface of the C-arm.

Specifically, a position-limiting device disposed on the outer surface of the C-arm is further provided, and the position-limiting device is disposed close to the first end.

Specifically, the position-limiting device is mounted on an inner side of the fixing plate.

Specifically, the tube assembly comprises a body, a first extension portion, a second extension portion, and a collimator. The body is used to accommodate an X-ray tube, and the bottom of the body is disposed within the inner surface of the C-arm. The first extension portion is used to accommodate a first transformer, the second extension portion is used to accommodate a second transformer, and a gap is formed between the first extension portion and the second extension portion. The collimator is located within the gap, and an outlet end portion of the collimator is substantially aligned with an end portion of the first extension portion and an end portion of the second extension portion.

Further provided in an exemplary embodiment of the present invention is a tube assembly mounting method. The method comprises: configuring an inner surface of an extension portion extending from a first end of a C-arm to be a plane; fixing a mounting plate on the plane, the mounting plate comprising at least one positioning recess; aligning at least one protrusion on a tube assembly with the at least one positioning recess, so as to match and align the tube assembly and the mounting plate; and fixing the tube assembly to the mounting plate.

Specifically, fixing the tube assembly to the mounting plate comprises: fixing the tube assembly by means of at least one screw passing through at least one through-hole provided on the tube assembly and at least one threaded hole provided on the mounting plate.

Specifically, the mounting method further comprises: mounting an extension housing between an end portion where an outlet of the tube assembly is located and an inner surface of the C-arm, wherein a plane in which the top of the extension housing is located is substantially parallel to a top plane of the tube assembly.

Other features and aspects will become apparent from the following detailed description, accompanying drawings, and claims.

BRIEF DESCRIPTION OF THE DRAWINGS

The present invention can be better understood through the description of exemplary embodiments of the present invention in conjunction with the accompanying drawings, in which.

DETAILED DESCRIPTION

Specific implementations of the present invention will be described below. It should be noted that in the specific description of these embodiments, for the sake of brevity and conciseness, this specification may not describe all features of the actual implementations in detail. It should be understood that in the actual implementation process of any implementations, just as in the process of any engineering project or design project, a variety of specific decisions are often made to achieve specific goals of the developer and to meet system-related or business-related constraints, which may also vary from one implementation to another. Furthermore, it should also be understood that although efforts made in such development processes may be complex and tedious, for those of ordinary skill in the art related to the content disclosed in the present invention, some design, manufacture, or production changes based on the technical content disclosed in the present disclosure are only common technical means, and should not be construed as insufficient content of the present disclosure.

Unless defined otherwise, technical terms or scientific terms used in the claims and specification should have usual meanings understood by those of ordinary skill in the technical field to which the present invention belongs. The terms "first," "second" and similar terms used in the description and claims of the patent application of the present invention do not denote any order, quantity, or importance, but are merely intended to distinguish between different constituents. The terms "one" or "a/an" and similar terms do not denote a limitation of quantity, but rather the presence of at least one. The terms "include" or "comprise" and similar terms mean that an element or article preceding the term "include" or "comprise" encompasses elements or articles and their equivalent elements listed after "include" or "comprise," and does not exclude other elements or articles. The terms "connect" or "connected" and similar words are not limited to physical or mechanical connections, and are not limited to direct or indirect connections.

Figure 2:
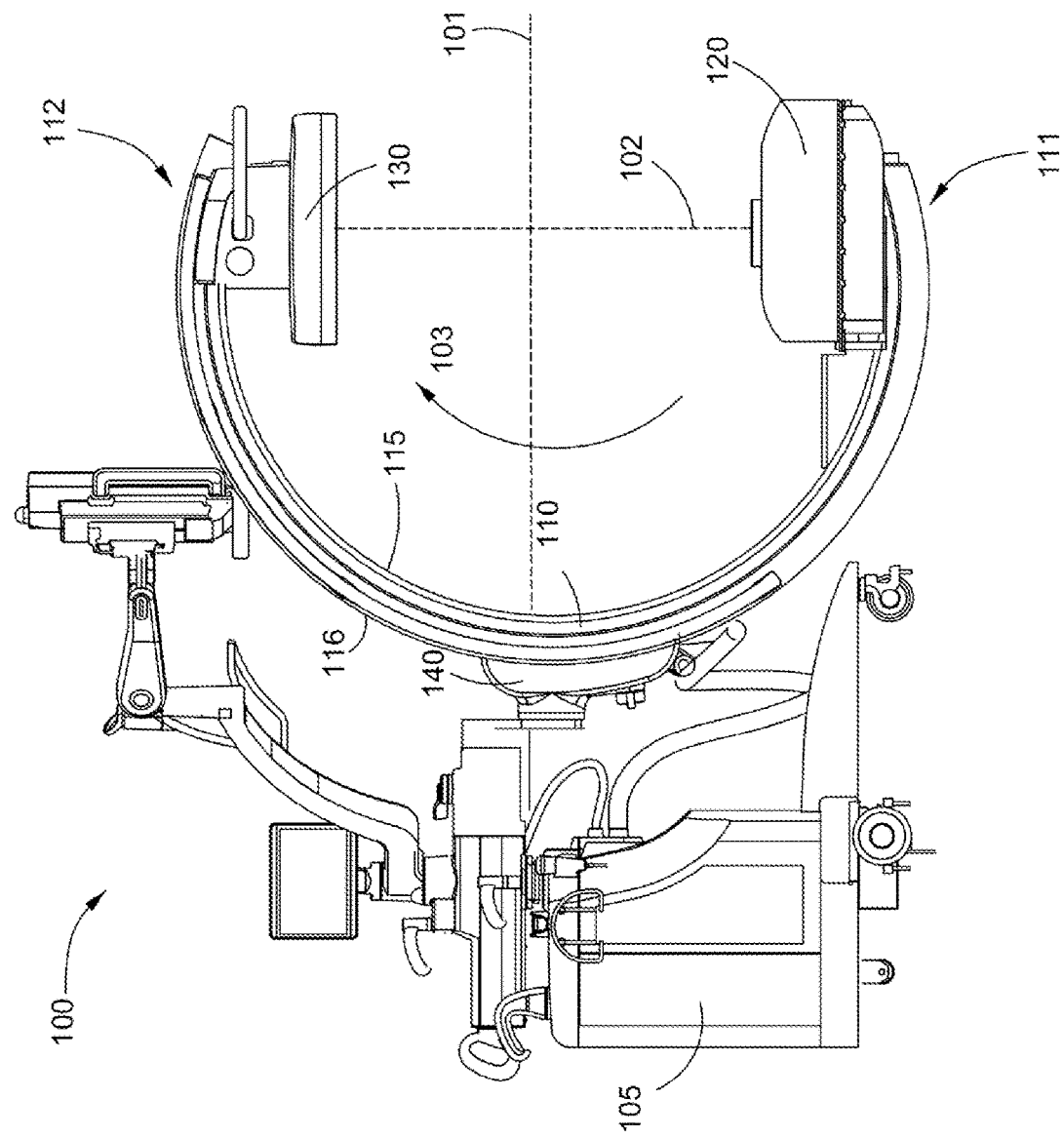
FIG. 2 is a schematic diagram showing a C-arm imaging system at a first position according to some embodiments of the present invention.
Figure 3:
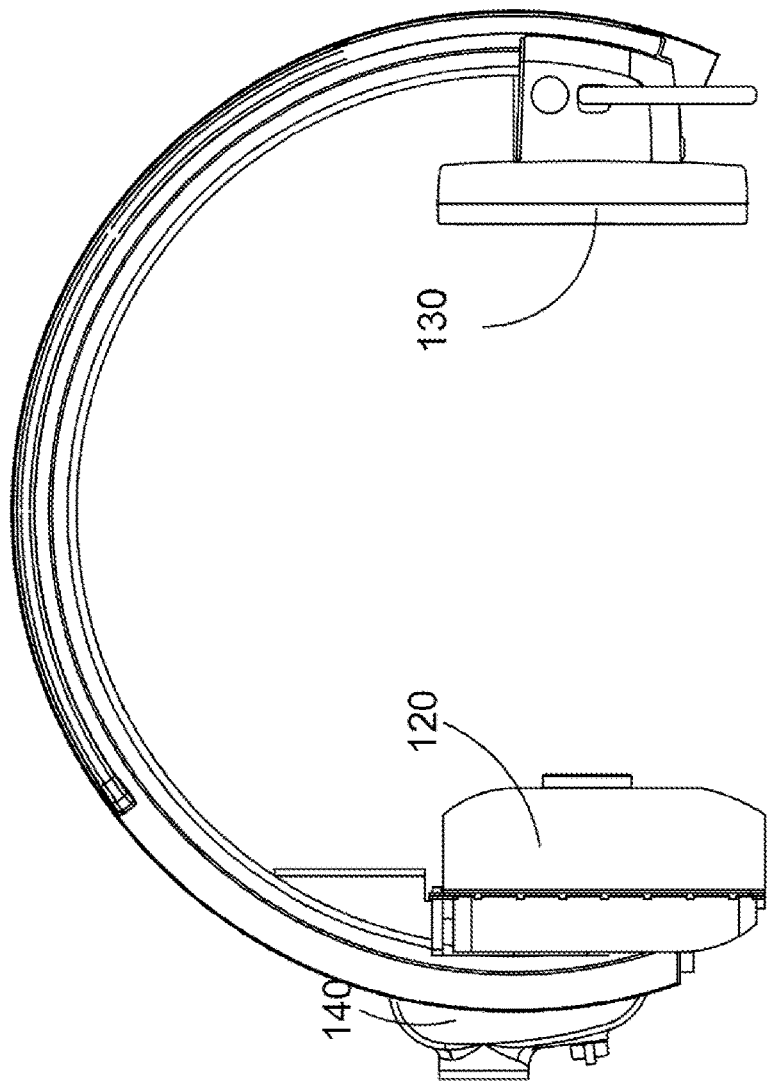
FIG. 3 is a schematic diagram showing the C-arm imaging system at a second position according to some embodiments of the present invention.

FIG. 2 shows a schematic diagram of a C-arm imaging system 100 at a first position according to some embodiments of the present application. FIG. 3 shows a schematic diagram of the C-arm imaging system 100 at a second position according to some embodiments of the present application. For ease of description, FIG. 3 only shows a C-arm, a tube assembly and a detector assembly respectively provided at two ends, and a rotation component, while omitting a base, a display and other portions.

The C-arm imaging system 100 may utilize a plurality of imaging modalities (for example, fluoroscopy, computed tomography, tomosynthesis, X-radiography, and the like) to acquire two-dimensional (2D) and/or 3D image data. The C-arm imaging system 100 may be used for both diagnosis and interventional imaging. In addition, the C-arm imaging system 100 may be used for general purposes (for example, general radiology, orthopedics, or the like) and special purposes (for example, an image-guided surgery).

As shown in FIG. 2 to FIG. 3, the C-arm imaging system 100 includes a support structure or a base 105, a C-arm 110, a tube assembly 120, a detector assembly 130, and a rotation assembly 140.

The base 105 supports the C-arm 110 and maintains the C-arm 110 at a suspended position. The lower part of the base 105 includes wheels or casters used for providing mobility to the system 100.

The base 105 may include an electronic controller (for example, a control and computing unit), and the electronic controller processes instructions or commands sent from a user input device during operation of the imaging system 100. The base 105 may further include an internal power supply (not shown), and the internal power supply provides power to operate the imaging system 100. Alternatively, the base 105 may be connected to an external power supply to facilitate power supply to the imaging system 100. A plurality of connection lines (for example, power cables such as conductive cables) may be provided to transfer power, instructions, and/or data between the tube assembly 120, the detector assembly 130, and the control and computing unit. The plurality of connection lines may transfer power from a power supply (for example, an internal source and/or an external source) to the tube assembly 120 and the detector assembly 130.

The C-arm 110 includes an inner surface 115 and an outer surface 116 disposed opposite to each other. Preferably, the inner surface 115 is an inner circumference, the outer surface 116 is an outer circumference, and the inner surface and the outer surface terminate at a first end 111 and a second end 112 that are opposite to each other. In some embodiments, the C-arm 110 has a uniform C-shape, but the present application is not limited thereto, and the C-arm 110 may also include any arc-shaped member. Further, other configurations of a mobile imaging system may also be provided, for example, support arms may be positioned on the patient's bed, etc.

The rotation assembly 140 is mounted on the outer surface of the C-arm, and the C-arm is movable relative to the rotation assembly 140. Preferably, an outer surface opposite to an inner surface on which the tube assembly 120 is located is slidable relative to the rotation assembly 140.

The outer surface 116 of the C-arm 110 is not a uniform curved surface. An arc-shaped recess is provided at an outer side of the C-arm. The recess extends from the first end to the second end, and serves as a sliding track of the C-arm. The rotation assembly 140 includes a sliding member fitting with the recess. The sliding member can be disposed in the sliding track, and can slide in the sliding track, thereby realizing rotation of the C-arm. The outer surface in the present application refers to side walls and the bottom of the entire recess and the outer surface opposite to the inner surface.

The tube assembly 120 is located at the first end 111 of the C-arm, and is mounted on an inner surface 115 of the C-arm 110. Specifically, the bottom of the tube assembly 120 is in contact with the inner surface 115 of the C-arm 110, so that the entire tube assembly 120 is located within the inner surface of the C-arm.

Figure 7:
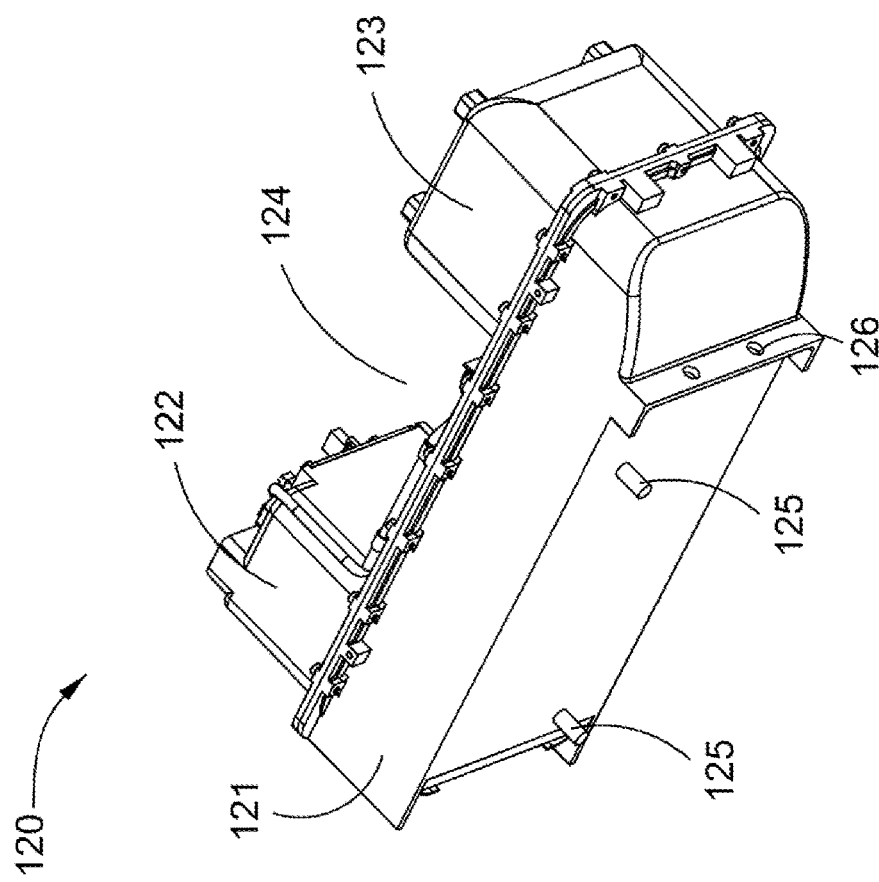
FIG. 7 is a schematic diagram of the tube assembly of the C-arm imaging system shown in FIG. 2 according to some embodiments.

FIG. 7 shows a schematic diagram of the tube assembly 120 of the C-arm imaging system 100 according to some embodiments. For ease of description, collimator components are omitted in FIG. 7. However, a person of ordinary skill in the art should understand that a collimator is disposed within the gap 124 shown in FIG. 7.

As shown in FIG. 7, the tube assembly 120 includes a body 121, a first extension portion 122, a second extension portion 123, and a collimator (not shown in the figure). The body 121 can be used to accommodate an X-ray tube, and the bottom of the body is disposed within the inner surface of the C-arm.

The first extension portion 122 is used to accommodate a first transformer. The second extension portion 123 is used to accommodate a second transformer, and a gap 124 is formed between the first extension portion 122 and the second extension portion 123. The collimator can be disposed within the gap 124, and an outlet end portion of the collimator is substantially aligned with an end portion of the first extension portion 122 and an end portion of the second extension portion 123.

The first extension portion 122 and the second extension portion 123 are disposed opposite to each other and above the body 121 (in an emission direction of X-rays). The body, the first extension portion, and the second extension portion may be integrally formed or connected together by welding, sticking, or the like. The first transformer may be a filament transformer, and the second transformer may be a high-voltage transformer.

Specifically, a first end portion of the first extension portion 122 is substantially aligned with a first end portion of the second extension portion 123, a second end portion of the first extension portion and a second end portion of the second extension portion are respectively connected to the body, and the body, the first extension portion and the second extension portion substantially form a recessed structure. By recessing the collimator, the height of the tube assembly may be reduced in comparison to conventional configurations, thereby increasing the distance and space between a detector surface of the detector assembly and an outlet of the tube assembly.

The detector assembly 130 is mounted at the second end 112 of the C-arm, and the detector assembly 130 is disposed opposite to the tube assembly 120. The outlet of the collimator of the tube assembly is aligned with the center of a detector plane of the detector assembly.

During an imaging operation, a part of the patient's body placed in a space (for example, a gap) formed between the tube assembly 120 and the detector assembly 130 may be irradiated using radiation from an X-ray source. For example, X-ray radiation generated by the X-ray source may penetrate the irradiated part of the patient's body and propagate to the detector assembly 130 where the radiation is captured. The part of the patient's body placed between the tube assembly 120 and the detector assembly 130 is penetrated, so that an image of the patient's body is captured and relayed to the electronic controller of the imaging system 100 (for example, via an electrical connection line such as a conductive cable).

The C-arm 110 is rotatably connected to the base 105. The C-arm 110 can be rotated laterally around an axis 101 relative to the base 105, for example, rotated 360 degrees. The C-arm 110 can further be rotated relative to the rotation assembly 140. The C-arm 110 can be rotated as described above such that the positions of the tube assembly 120 and the detector assembly 130 are adjusted through a plurality of positions. For example, at an initial first position as shown in FIG. 2, the tube assembly 120 and the detector assembly 130 are disposed opposite to each other. The detector assembly 130 is vertically positioned above the tube assembly 120 relative to the ground where the imaging system 100 is located, and an axis 102 where the detector assembly is located is perpendicular to the rotation axis 101, and is parallel to a line connecting the outlet of the tube assembly 120 (the outlet of the collimator) and a central point of the detector surface.

The C-arm 110 can be rotated so as to be adjusted from the first position to a second position different from the first position. In some embodiments as shown in FIG. 3, the second position may be a position at which the tube assembly 120 and the detector assembly 130 are rotated 90 degrees together relative to the first position, so that the tube assembly 120 is positioned to the left of the detector assembly 130 and parallel thereto, that is, the entire C-arm 110 is substantially above the axis 101. The line connecting the outlet of the tube assembly 120 and the central point of the detector surface is parallel to the rotation axis 101, that is, is substantially in a horizontal direction. The tube assembly 120 is disposed opposite to the rotation assembly 140 relative to the inner surface and the outer surface of the C-arm.

In the process of rotating the C-arm from the first position to the second position, the C-arm is rotated 90 degrees according to a clockwise direction 103, such that the direction of a centerline of X-ray beams emitted by the X-ray source in the tube assembly is parallel to the axis 101. The clockwise direction indicates that the tube assembly is rotated in a direction toward the rotation assembly. When the C-arm is rotated to the second position, the outer surface opposite to the inner surface on which the tube assembly is located can slide relative to the rotation assembly, and a sliding track is also provided on said outer surface.

Certainly, positioning at different angles and positions can be achieved through different rotation angles and directions of the rotation assembly of the C-arm. For example, the C-arm can further be rotated such that the tube assembly 120 is located to the right of the detector assembly 130, and the detector assembly 130 and the rotation assembly 140 are disposed opposite to each other relative to the inner surface and the outer surface of the C-arm, that is, the entire C-arm 110 is substantially below the axis 101.

The tube assembly is configured to be positioned within the inner surface of the C-arm 110, so that a track can be further disposed on the outer surface of the C-arm provided with the tube assembly, and the rotation assembly can accordingly pass through said outer surface (an outer surface of the extension portion), thereby realizing rotation of the C-arm. By such a design, on the one hand, the height of the tube assembly 120 (for example, a distance from the bottom of the tube assembly to the outlet of the collimator) can be reduced. The reduced height of the tube assembly can increase a distance from the outlet of the tube assembly (the outlet of the collimator) to the detector surface of the detector assembly, that is, increase the size of the entire patient accommodation space, thereby enabling the C-arm 110 to accommodate a large-size patient for imaging and/or improving the ease of use of the C-arm 110. On the other hand, such design enables the C-arm to be rotated from the first position as shown in FIG. 2 to the second position as shown in FIG. 3, and achieves the angle at which the detector assembly and the tube assembly are parallel to the rotation axis and the tube assembly is opposite to the rotation assembly, thereby achieving wider and more flexible angle adjustments.

Figure 4:
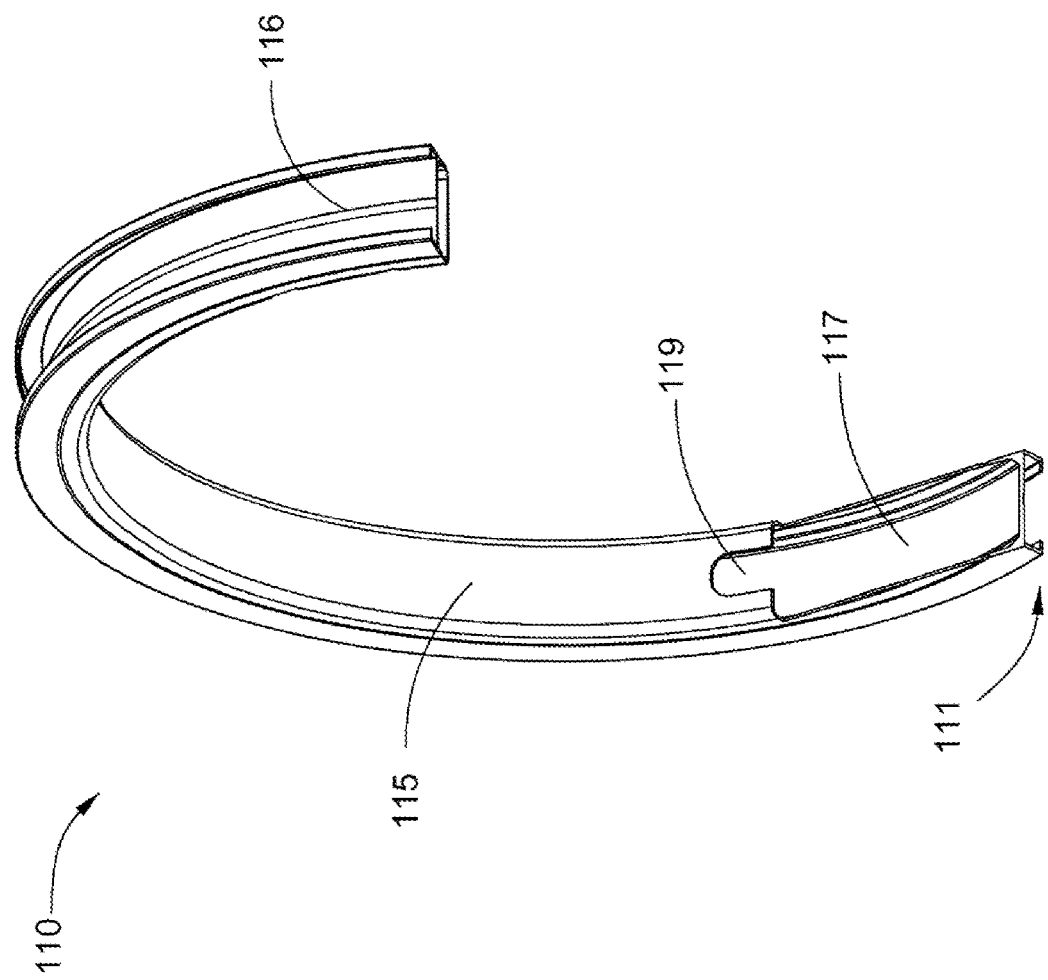
FIG. 4 is a schematic diagram of the C-arm of the C-arm imaging system shown in FIG. 2.
Figure 5:
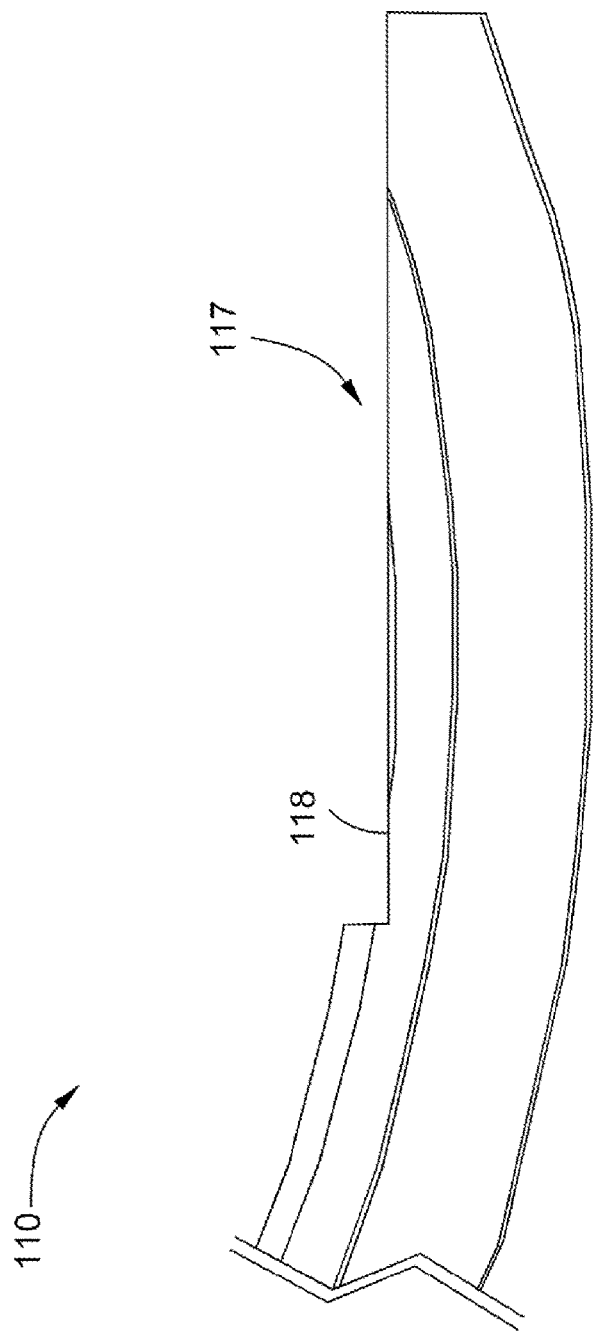
FIG. 5 is a cross-sectional view of the C-arm shown in FIG. 4.

FIG. 4 shows a schematic diagram of the C-arm 110 of the C-arm imaging system 100 shown in FIG. 2, and FIG. 5 is a cross-sectional view of the C-arm shown in FIG. 4. As shown in FIG. 4 to FIG. 5, the C-arm 110 includes a C-arm body and an extension portion 117 extending along the first end 111. An inner surface of the extension portion 117 is configured to be a plane 118, the plane is used to mount the tube assembly thereon, and an outer surface of the extension portion is slidable relative to the rotation assembly.

Figure 1:
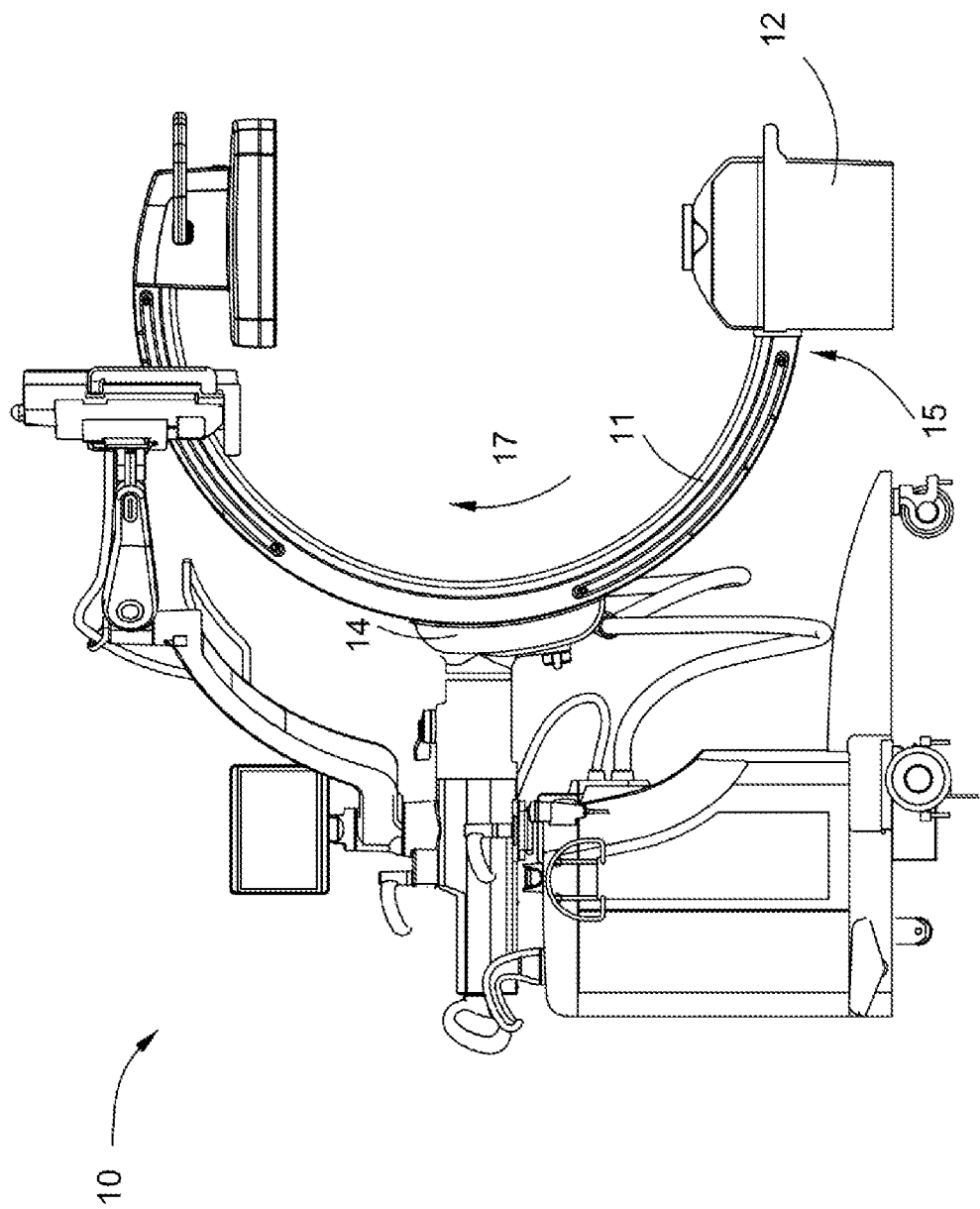
FIG. 1 is a schematic diagram of a C-arm imaging system in the prior art.

The C-arm in the present application has a perimeter greater than that of a conventional C-arm (for example, the C-arm having a side-mounted tube shown in FIG. 1). If the C-arm is circularly curved, the perimeter of the C-arm in the present application exceeds a semi-circular arc. In some embodiments, compared with a conventional C-arm, the C-arm in the present application has the extension portion 117 extending along the first end, and the extension portion 117 is integrally formed with the body of the C-arm.

In some embodiments, the plane of the extension portion is obtained by means of machining, that is, the C-arm may be obtained by machining the inner surface of the extension portion integrally formed with the C-arm into a particular shape. In some other embodiments, the C-arm having a planar inner surface is integrally formed.

In some embodiments, the inner surface of the C-arm further includes a wiring slot 119 positioned adjacent to the plane 118, and the wiring slot can be configured to accommodate various cables connecting to components such as the tube assembly.

Figure 6:
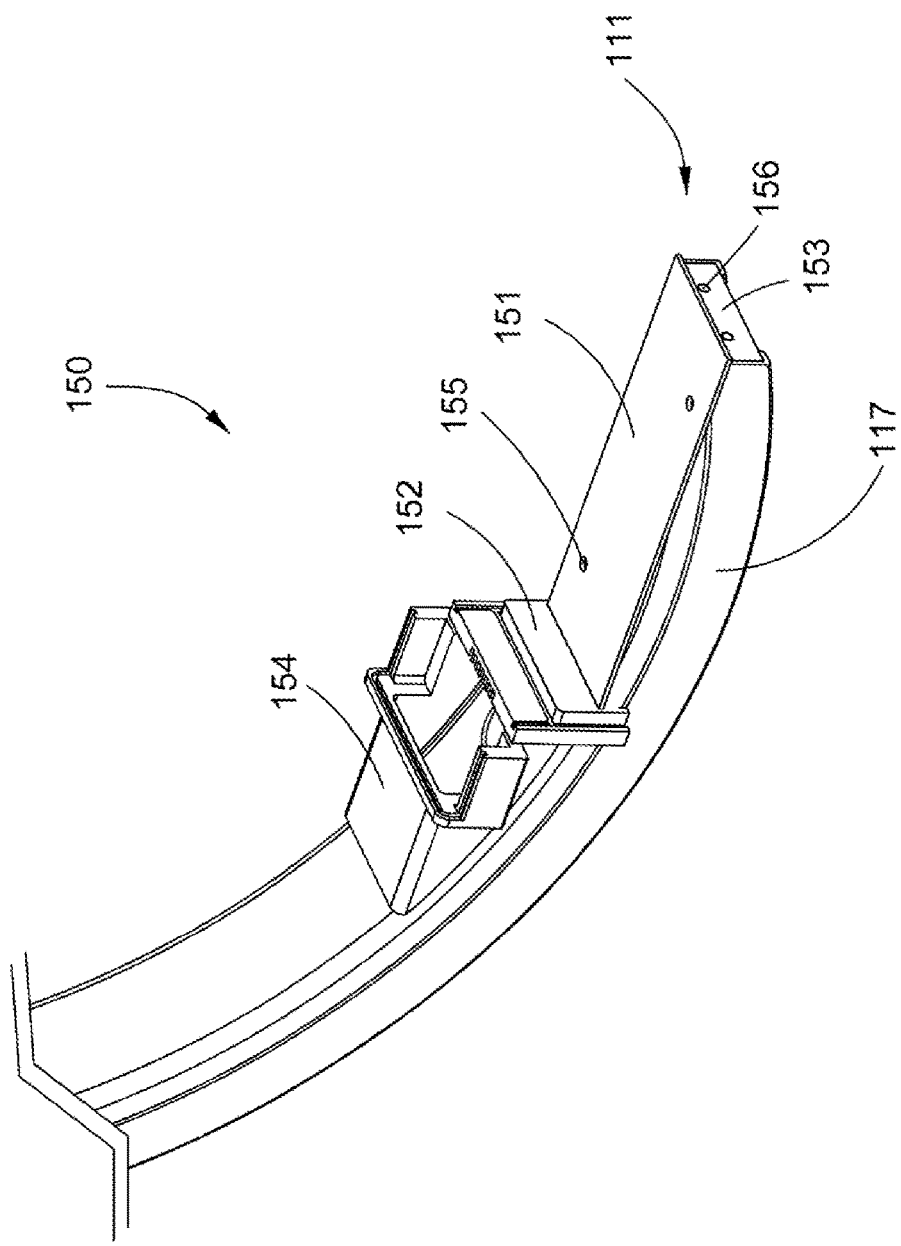
FIG. 6 is a schematic diagram of a mounting assembly of the C-arm imaging system shown in FIG. 2 according to some embodiments.

FIG. 6 shows a schematic diagram of a mounting assembly 150 of the C-arm imaging system shown in FIG. 2 according to some embodiments. FIG. 7 is a schematic diagram of the tube assembly 120 of the C-arm imaging system shown in FIG. 2 according to some embodiments. As shown in FIG. 6 to FIG. 7, the C-arm imaging system 100 further includes a mounting assembly 150. The mounting assembly 150 is disposed on the inner surface of the C-arm 110. Preferably, the mounting assembly 150 is mounted on the inner surface of the extension portion 117 of the C-arm, and is provided with at least one positioning recess 155, and the tube assembly 120 includes at least one protrusion 125 corresponding to the at least one positioning recess 155.

The mounting assembly 150 includes a first plate 151 and a second plate 152 disposed perpendicularly to each other. The first plate 151 is disposed on the plane of the extension portion 117 and used to support the tube assembly 120, the second plate 152 is disposed on a side located away from the first end portion, and the at least one positioning recess 155 is disposed on the first plate 151. In some embodiments, the first plate 151 and the second plate 152 may be fixed together through welding.

In some embodiments, two positioning recesses 155 are provided on the first plate 151. The two positioning recesses are diagonally disposed, that is, the two positioning recesses are located in the direction of a diagonal of the first plate or in a direction parallel to the diagonal. Two protrusions 125 are also diagonally disposed at the bottom of the tube assembly 120.

In some embodiments, one of the two positioning recesses on the first plate 151 is a hole-shaped positioning structure completely matching the protrusion 125, and the other has a recess shape slightly larger than the area of the protrusion, so as to reserve a part of the space to prevent an assembly error.

A person of ordinary skill in the art should understand that any number of positioning recesses may be provided on the first plate 151, and a plurality of positioning recesses may also be provided in any arrangement, as long as the positioning recesses can correspond to the protrusions at the bottom of the tube assembly.

In some embodiments, the second plate is disposed perpendicularly to the plane of the C-arm. The side of the second plate includes an H-shaped recess, the side portion of the tube assembly includes an H-shaped protrusion, and the H-shaped recess on the side of the second plate can engage with the tube assembly. Certainly, the shape of the recess on the second plate may be arbitrarily set, or other mounting methods may be adopted without configuring a recess.

In some embodiments, on the other side of the second plate 152 not in contact with the tube assembly, there are only several strip-shaped recesses for heat dissipation.

In some embodiments, the mounting assembly 150 further includes a fixing plate 153 perpendicular to the first plate 151. The fixing plate 153 is mounted at an end portion of the first end 111 of the C-arm 110, and the fixing plate 153 is configured to fix the tube assembly 120.

Specifically, the fixing plate 153 and the second plate 152 are disposed parallel to each other, and are located at two opposite ends of the first plate 151. The fixing plate 153 includes at least one threaded hole 156, the bottom of the tube assembly 120 also includes at least one through-hole 126, and a screw can be used to fix the tube assembly and the C-arm through the at least one through-hole 126 and threaded hole 156. The first plate and the fixing plate can be fixed together by welding or other techniques.

Although FIG. 6 shows that the tube assembly is fixed through the threaded hole provided on the fixing plate, a person of ordinary skill in the art should understand that the tube assembly can further be fixed in any other suitable manners. For example, protrusion portions can be provided on the fixing plate and the second plate, and by providing threaded holes on the protrusion portions, and by providing through-holes on two sides of the tube assembly, the tube assembly can be fixed on the C-arm by screws. In some non-limiting embodiments, through-holes perpendicular to the direction of the through-holes shown in FIG. 7 can be provided on two sides of the tube, and the tube assembly is fixed on the C-arm by means of installing screws in the same direction as that of the at least one protrusion 125.

The mounting assembly 150 further includes an extension housing 154, and the extension housing extends horizontally from an end portion of the second plate 152 to the inner surface of the C-arm. In some embodiments, a top plane of the extension housing is parallel to the first plate 151 or the plane 118 of the extension portion of the C-arm. The extension housing serves as a reinforcing member. On the one hand, the extension housing can increase the rigidity of the C-arm and improve the bending resistance thereof, and on the other hand, the extension housing can realize functions such as sealing and water resistance.

FIG. 6 only shows an exemplary schematic diagram of the extension housing, and any form of housing or cover can be provided to realize the foregoing functions.

The C-arm imaging system 100 further includes a position-limiting device (not shown in the figure) disposed on the outer surface of the C-arm, and the position-limiting device is disposed close to the first end. In some embodiments, the position-limiting device is disposed on an inner side of the fixing plate 153.

Figure 8:
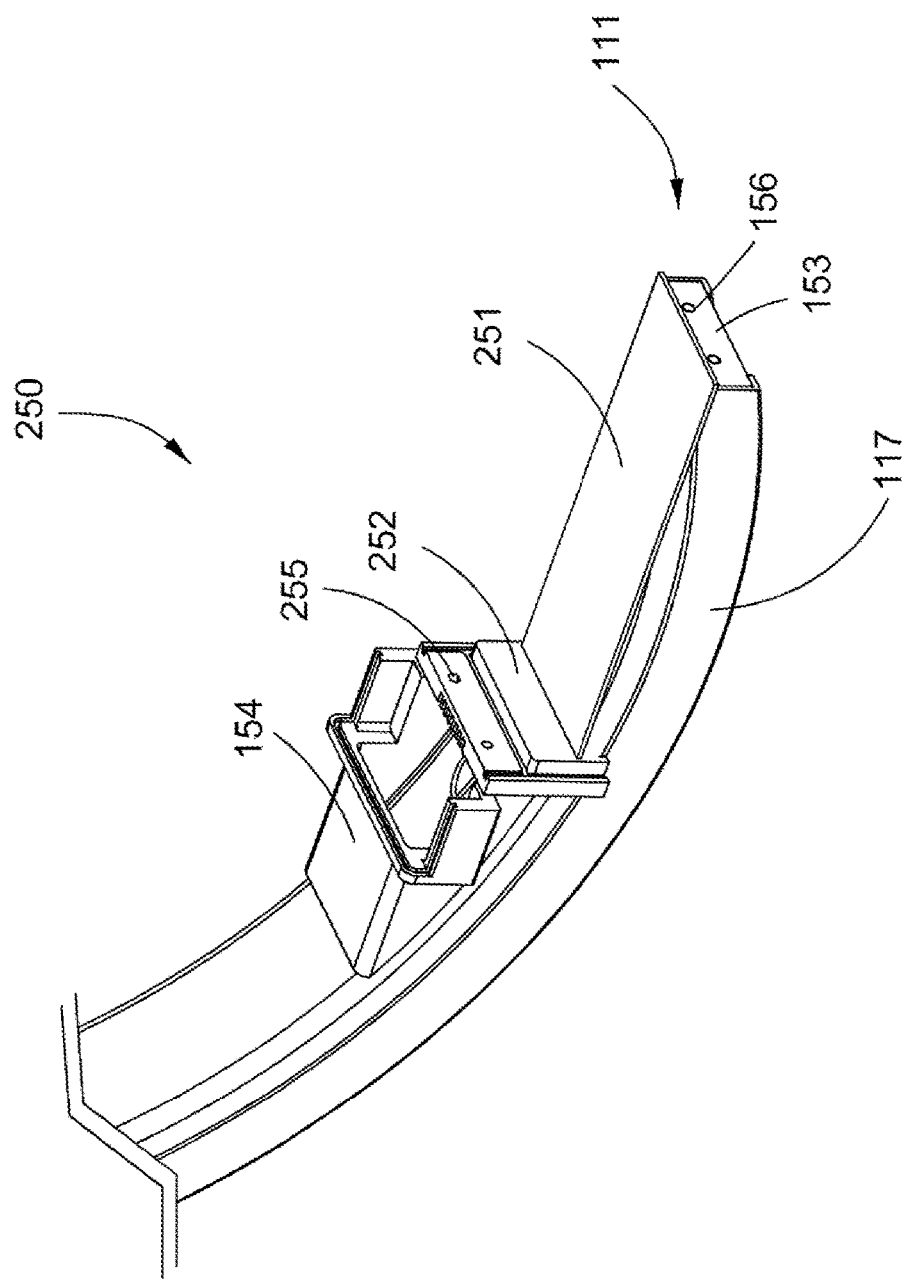
FIG. 8 is a schematic diagram of a mounting assembly of the C-arm imaging system shown in FIG. 2 according to some other embodiments.

FIG. 8 is a schematic diagram of a mounting assembly of the C-arm imaging system shown in FIG. 2 according to some other embodiments. Different from the mounting assembly 150 shown in FIG. 6 in some embodiments, a mounting assembly 250 shown in FIG. 8 includes a first plate 251 and a second plate 252 disposed perpendicularly to each other, and at least one positioning recess 255 is disposed on the second plate 252.

In some embodiments, the second plate 252 is provided with two positioning recesses 255. Correspondingly, the side of the tube assembly 120 is also provided with two protrusions (not shown in the figure).

Figure 9:
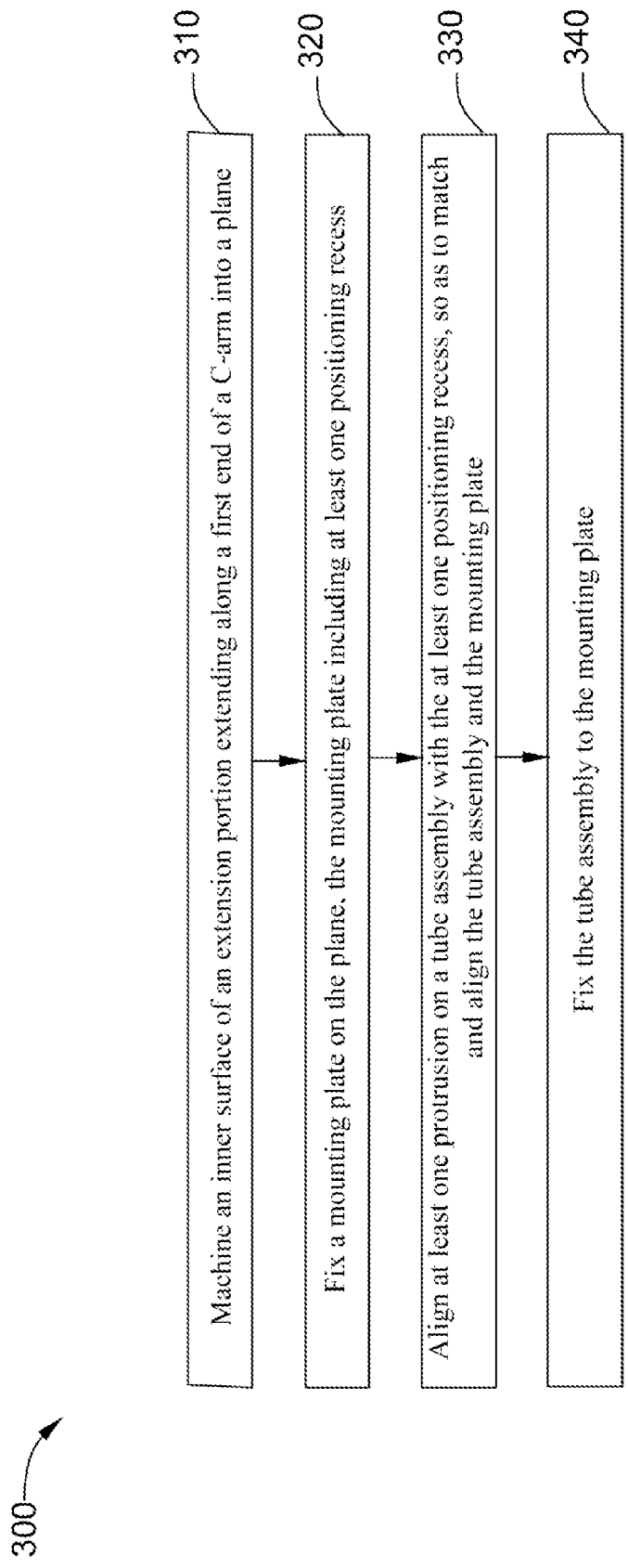
FIG. 9 is a flowchart of a tube mounting method according to some embodiments of the present invention.

FIG. 9 is a flowchart of a tube mounting method according to some embodiments of the present invention. As shown in FIG. 9, a tube mounting method 300 includes step 310, step 320, step 330, and step 340.

In step 310, an inner surface of an extension portion extending along a first end of a C-arm is configured to be a plane.

Specifically, the body of the C-arm and the extension portion are integrally formed, the inner surface of the extension portion is machined into a plane, and the plane can be used to mount a tube assembly thereon. Certainly, the inner surface of the extension portion can further be machined into any shape, and the shape can match the shape of the bottom of the tube assembly.

An outer surface of the extension portion and an outer surface of the body of the C-arm are uniform and smooth, so as to form a sliding track of a rotation assembly.

In step 320, a mounting plate is fixed on the plane, and the mounting plate includes at least one positioning recess.

Specifically, the mounting plate includes a first plate and a second plate disposed perpendicularly to each other, the first plate is disposed on the plane of the extension portion and used to support the tube assembly, and the second plate is disposed on a side located away from a first end portion.

In some embodiments, the at least one positioning recess is provided on the first plate. Correspondingly, the bottom of the tube assembly is also provided with at least one protrusion. Preferably, two positioning recesses are diagonally disposed on the first plate, and two protrusions are also diagonally disposed at the bottom of the tube assembly.

In some other embodiments, the at least one positioning recess is provided on the second plate. Correspondingly, the side of the tube assembly is also provided with at least one protrusion. Preferably, the second plate is provided with two positioning recesses, and the side of the tube assembly is correspondingly provided with two protrusions.

In step 330, the at least one protrusion on the tube assembly is aligned with the at least one positioning recess, so as to match and align the tube assembly and the mounting plate.

Specifically, by aligning the protrusion on the tube assembly with the positioning recess on the mounting plate, the tube assembly can be prepared to be mounted on the mounting plate, thereby achieving quick and easy positioning.

In step 340, the tube assembly is fixed to the mounting plate.

Specifically, the mounting plate further includes a fixing plate. The fixing plate is disposed perpendicularly to the first plate, and mounted at an end portion of the first end of the C-arm, and the fixing plate is configured to fix the tube assembly.

In some embodiments, the fixing plate and the second plate are disposed parallel to each other, and are located at two opposite ends of the first plate. The fixing plate includes at least one threaded hole, the bottom of the tube assembly also includes at least one through-hole, and a screw can be used to fix the tube assembly and the C-arm through the at least one through-hole and threaded hole.

In some other embodiments, the mounting plate is provided with at least one threaded hole disposed in the same direction as that of the at least one protrusion. The bottom and/or side of the tube assembly is provided with through-holes disposed in the same direction as that of the threaded hole, so as to fix the tube assembly and the C-arm by means of screws passing through the through-holes and the threaded hole and disposed in the same direction as that of the at least one protrusion.

In some embodiments, the mounting method further includes: mounting an extension housing between an end portion where an outlet of the tube assembly is located and an inner surface of the C-arm, such that a plane in which the top of the extension housing is located is substantially parallel to a top plane of the tube assembly. On the one hand, the extension housing can increase the rigidity of the C-arm and improve the bending resistance thereof, and on the other hand, the extension housing can realize functions such as sealing and water resistance.

In the C-arm imaging system in some embodiments of the present invention, the tube assembly is mounted on the inner surface of the C-arm, so that the outer surface opposite to the inner surface can further be provided with a sliding track, enabling the outer surface opposite to the inner surface on which the tube assembly is located to slide relative to the rotation assembly. On the one hand, the height of the tube assembly can be reduced, so as to increase a distance from the outlet of the tube assembly to the detector surface of the detector assembly, that is, increase the size of the entire patient accommodation space, thereby enabling the C-arm to accommodate a large-size patient for imaging and/or improving the ease of use of the C-arm. On the other hand, such design enables the C-arm to be rotated 180 degrees in various directions relative to the rotation assembly, and achieves the angle at which the detector assembly and the tube assembly are parallel to the rotation axis and the tube assembly is opposite to the rotation assembly, thereby achieving wider and more flexible angle adjustments.

Some exemplary embodiments have been described above, however, it should be understood that various modifications may be made. For example, suitable results can be achieved if the described techniques are performed in different orders and/or if components in the described systems, architectures, devices, or circuits are combined in different ways and/or replaced or supplemented by additional components or equivalents thereof. Accordingly, other implementations also fall within the protection scope of the claims.

The invention claimed is:

1. A C-arm imaging system, comprising:
   a C-arm, comprising an inner surface and an outer surface disposed opposite to each other;
   a tube assembly located at a first end of the C-arm and mounted on the inner surface of the C-arm;
   a detector assembly located at a second end of the C-arm opposite to the first end;
   a rotation assembly mounted on the outer surface of the C-arm, wherein the C-arm is movable relative to the rotation assembly, and the outer surface opposite to the inner surface on which the tube assembly is located is slidable relative to the rotation assembly; and
   a mounting assembly disposed on the tube assembly, the mounting assembly comprising a first plate and a second plate disposed perpendicularly to each other, and at least one positioning recess disposed on the first plate or the second plate.

2. The C-arm imaging system according to claim 1, wherein the C-arm comprises an extension portion extending along the first end, the inner surface of the extension portion is configured to be a plane, the plane is configured to mount the tube assembly thereon, and the outer surface of the extension portion is slidable relative to the rotation assembly.

3. The C-arm imaging system according to claim 2, wherein the mounting assembly is disposed on the extension portion, and the tube assembly comprises at least one protrusion corresponding to the at least one positioning recess.

4. The C-arm imaging system according to claim 3, wherein the first plate is disposed on the plane of the extension portion and used to support the tube assembly, and the second plate is disposed on a side located away from the first end.

5. The C-arm imaging system according to claim 4, wherein the mounting assembly comprises two positioning recesses, and the two positioning recesses are diagonally disposed.

6. The C-arm imaging system according to claim 4, wherein the mounting assembly further comprises a fixing plate perpendicular to the first plate, the fixing plate is mounted at an end portion of the first end, and the fixing plate is configured to fix the tube assembly.

7. The C-arm imaging system according to claim 6, wherein the fixing plate comprises at least one threaded hole, and the tube assembly comprises at least one through-hole fitting with the at least one threaded hole.

8. The C-arm imaging system according to claim 4, wherein the mounting assembly further comprises an extension housing, and the extension housing extends horizontally from an end portion of the second plate to the inner surface of the C-arm.

9. The C-arm imaging system according to claim 1, further comprising a position-limiting device disposed on the outer surface of the C-arm, and the position-limiting device is disposed close to the first end.

10. A tube assembly mounting method, comprising:
    configuring an inner surface of an extension portion extending along a first end of a C-arm to be a plane;
    fixing a mounting plate on the plane, the mounting plate comprising a first plate and a second plate disposed perpendicularly to each other, and at least one positioning recess disposed on the first plate or the second plate;
    aligning at least one protrusion on a tube assembly with the at least one positioning recess, so as to match and align the tube assembly and the mounting plate; and
    fixing the tube assembly to the mounting plate.

11. A C-arm imaging system, comprising:
    a C-arm, comprising an inner surface and an outer surface disposed opposite to each other;
    a tube assembly located at a first end of the C-arm and mounted on the inner surface of the C-arm, the tube assembly comprising:
       a body for accommodating an X-ray tube, a bottom of the body being disposed within the inner surface of the C-arm,
       a first extension portion for accommodating a first transformer,
       a second extension portion for accommodating a second transformer, a gap being formed between the first extension portion and the second extension portion, and
       a collimator located within the gap, an outlet end portion of the collimator being substantially aligned with an end portion of the first extension portion and an end portion of the second extension portion;
    a detector assembly located at a second end of the C-arm opposite to the first end; and
    a rotation assembly mounted on the outer surface of the C-arm, wherein the C-arm is movable relative to the rotation assembly, and the outer surface opposite to the inner surface on which the tube assembly is located is slidable relative to the rotation assembly.

* * * * *